(12) United States Patent
Bao et al.

(10) Patent No.: US 8,670,385 B2
(45) Date of Patent: Mar. 11, 2014

(54) DYNAMIC ALLOCATION OF NETWORK RESOURCES FOR PROVISIONING SERVICES TO USER DEVICES

(75) Inventors: Derek Hongwei H. Bao, Concord, CA (US); Lalit R. Kotecha, San Ramon, CA (US); Sergio Aguirre, Southlake, TX (US); David Chiang, Fremont, CA (US); Vijay Tulsidas Madhav, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 280 days.

(21) Appl. No.: 13/215,758

(22) Filed: Aug. 23, 2011

(65) Prior Publication Data

US 2013/0051331 A1  Feb. 28, 2013

(51) Int. Cl.
*H04W 4/00* (2009.01)
(52) U.S. Cl.
USPC .......................... 370/328; 370/437; 370/465
(58) Field of Classification Search
USPC ......... 370/328–331, 335, 338, 340–342, 344, 370/432, 436–437, 465, 480
See application file for complete search history.

(56) References Cited

U.S. PATENT DOCUMENTS

| | | | |
|---|---|---|---|
| 6,411,806 B1* | 6/2002 | Garner et al. | 455/428 |
| 6,757,268 B1* | 6/2004 | Zendle | 370/338 |
| 6,791,952 B2* | 9/2004 | Lin et al. | 370/281 |
| 8,155,063 B2* | 4/2012 | Choi | 370/329 |
| 8,219,092 B2* | 7/2012 | Oteri et al. | 455/436 |
| 8,285,298 B2* | 10/2012 | Noriega et al. | 455/453 |
| 8,289,894 B2* | 10/2012 | Choudhury | 370/315 |
| 8,400,998 B2* | 3/2013 | Kuchibhotla et al. | 370/348 |
| 2007/0280099 A1* | 12/2007 | Geile et al. | 370/208 |
| 2010/0020731 A1* | 1/2010 | Bourdeaut et al. | 370/281 |
| 2012/0134267 A1* | 5/2012 | Noriega et al. | 370/230 |
| 2012/0165057 A1* | 6/2012 | Kato | 455/509 |
| 2012/0244794 A1* | 9/2012 | Brisebois et al. | 455/1 |
| 2013/0155883 A1* | 6/2013 | Bhattacharjee et al. | 370/252 |

OTHER PUBLICATIONS

3GPP Organizational Partners, "3$^{rd}$ Generation Partnership Project, Technical Specification Group Services and System Aspects, Multimedia Broadcast/Multicast Service (MBMS), Architecture and functional description (Release 9)", 3GPP TS 23.246, V9.5.0 (Jun. 2010), 65 pages.

* cited by examiner

*Primary Examiner* — Kevin Mew

(57) ABSTRACT

A device may receive, from a base station, information that identifies traffic conditions within the base station; and may assign one or more different frequency bands to each of one or more applications being provisioned, by the base station, to one or more user devices based on the information that identifies the traffic conditions within the base station. The device may also generate allocation information that identifies how the different frequency bands are allocated to each of the applications; and transmit, via the base station, the allocation information to the user devices, where transmitting the allocation information allows a user device to identify a frequency band with which to obtain an application.

19 Claims, 6 Drawing Sheets

| SIB ID 405 | | | TIME 410 | |
|---|---|---|---|---|
| SERVICE ID 415 | SERVICE TYPE 420 | FREQUENCY ID 425 | BASE STATION 430 | |
| APN1 | MT | BAND 1 / ALLOCATION 1 | 120-1 120-2 120-N | ← 432 |
| APN1 | MT | BAND 2 / ALLOCATION 2 | 120-1 | ← 434 |
| SERVICE1 | UT | BAND 3 / ALLOCATION 1 | 120-1 to 120-N | ← 436 |
| APPLICATION1 | BT | BAND 3 / ALLOCATION 2 | 120-1 120-3 | ← 438 |
| ... | | | | |

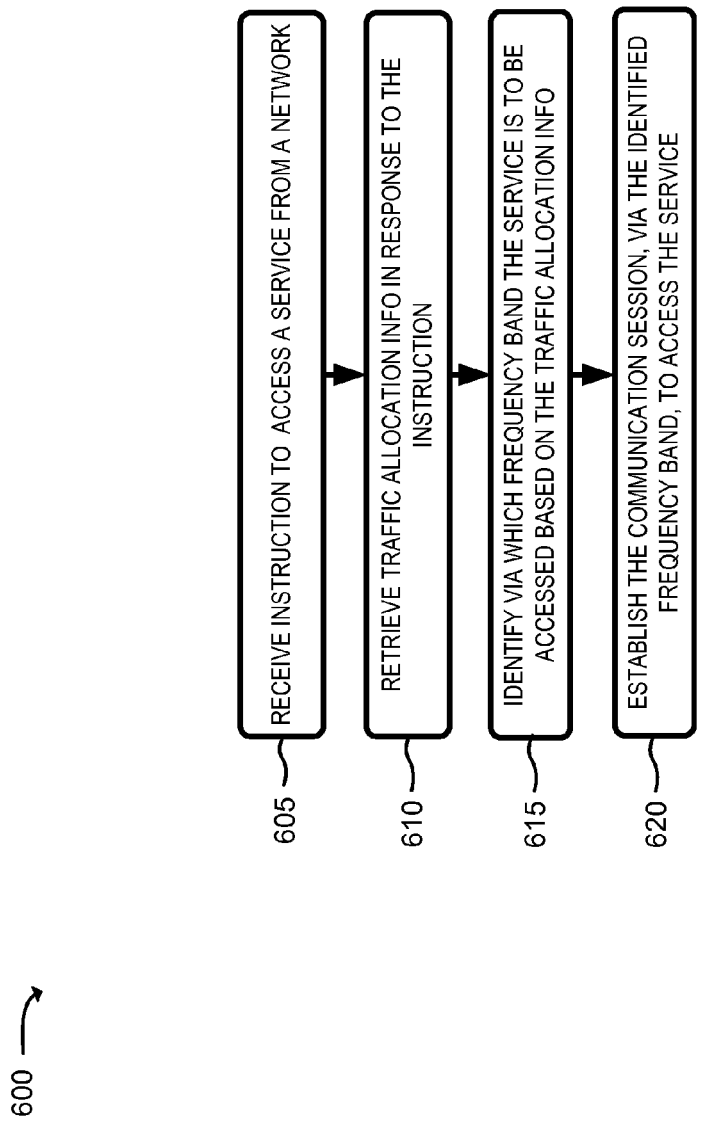

DYNAMIC ALLOCATION OF NETWORK RESOURCES FOR PROVISIONING SERVICES TO USER DEVICES

BACKGROUND

A user device may communicate with a network via a base station that processes traffic traveling between the user device and the network. The user device may communicate with the network while moving between cells associated with different base stations. User devices may communicate with the base stations to receive services, from the network, via unicast, multicast, and/or broadcast communications. The unicast, multicast, and/or broadcast communications may be received on different frequencies bands and/or allocations. However, the network may become congested when the number of user devices, accessing services via any one of the frequency allocations, is greater than a threshold.

BRIEF DESCRIPTION OF THE DRAWINGS

FIG. 4 is a diagram of an example extended system information data structure that stores allocation information;

FIG. 6 is a flow chart of an example process for accessing an application and/or service using allocation information, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a network to identify traffic conditions within a radio access network (RAN) and to allocate network resources (e.g., frequency bands, available bandwidth, base station capacity, etc.), within the RAN, based on the identified traffic conditions. The systems and/or methods may allocate the network resources by assigning applications and/or services to various frequency bands and/or allocations (e.g., within each of the frequency bands), based on the traffic conditions identified within the RAN.

The systems and/or methods may generate allocation information that identifies a manner in which the various frequency bands and/or frequency allocations have been allocated to each of the applications and/or services and via which the applications and services are to be provisioned to a user device. The systems and/or methods may also generate the allocation information to identify multiple frequency bands and/or allocations, rather than a single multicast frequency band and/or allocation, via which the user device can access an application and/or service as multicast traffic.

The systems and/or methods may allow the allocation information to be transmitted to the user device. Transmitting the allocation information, to the user device, may allow the user device to identify from which frequency band and/or frequency allocation a particular application or service is to be accessed and/or whether to access the particular application and/or service as unicast or multicast traffic. Additionally, or alternatively, allowing the user device to access the applications and/or services using the allocation information, may allow the RAN to provide, to the user device, the applications and/or services, as unicast and/or multicast traffic, without becoming congested.

Figure 1:
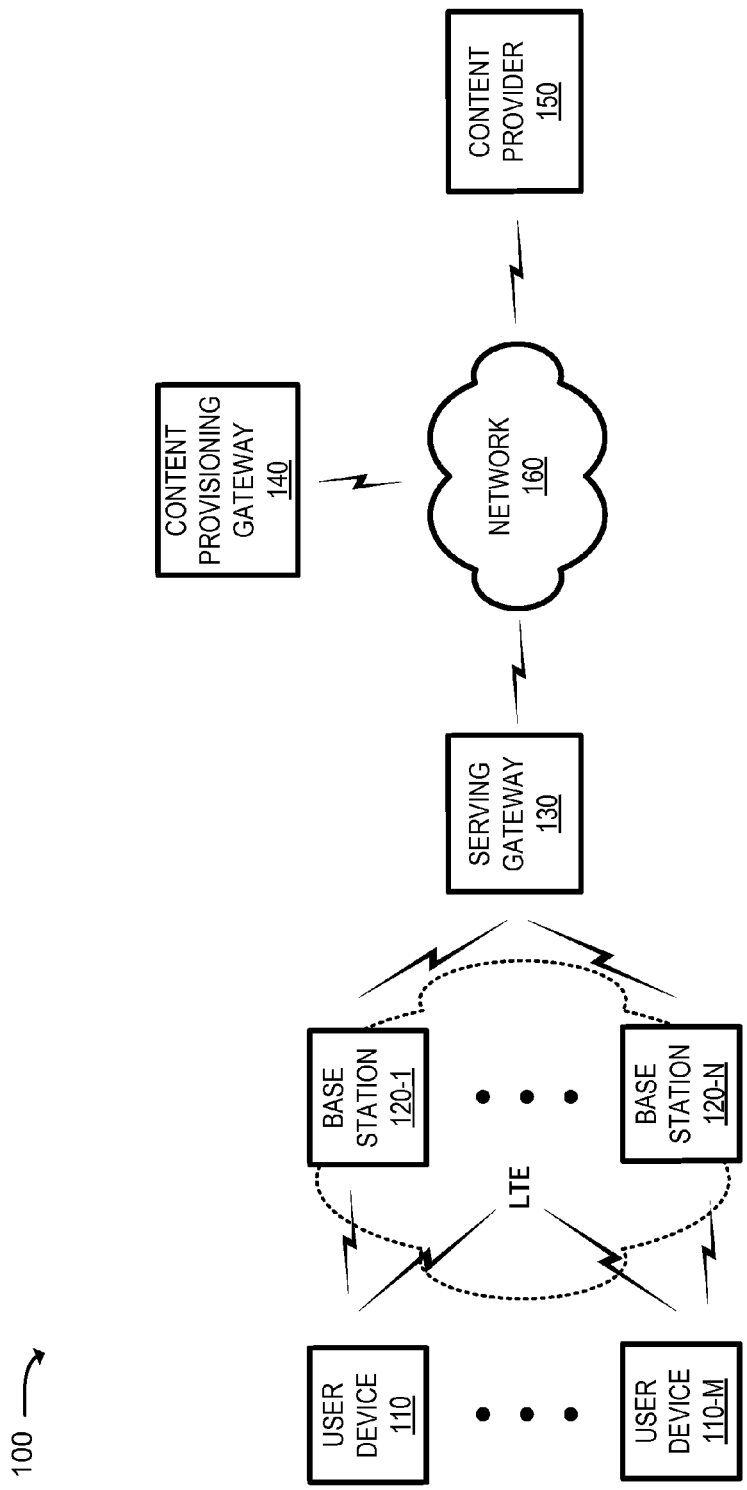
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of user devices 110-1, ..., 110-M (where M≥1) (hereinafter referred to collectively as "user devices 110" and individually as "user device 110"), a group of base stations 120-1, ..., 120-N (where N≥1) (hereinafter referred to collectively as "base stations 120" and individually as a "base station 120"), a serving gateway 130 (hereinafter referred to as "SGW 130"), a content provisioning gateway 140 (hereinafter referred to as "content gateway 140"), a content provider 150, and a network 160.

The number of devices, illustrated in FIG. 1, is provided for explanatory purposes only. In practice, there may be additional devices; fewer devices; different devices; or differently arranged devices than illustrated in FIG. 1. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

User device 110 may include any computation or communication device, such as a wireless mobile communication device that is capable of communicating with base station 120 and/or a network (e.g., network 160). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from network 160.

User device 110 may receive allocation information from base station 120 and may use the allocation information to identify from which base station 120, frequency band (e.g., associated with one or more frequencies via which base station 120 transmits traffic), and/or frequency allocation (e.g., within the frequency band) an application and/or service is to be accessed and/or obtained by user device 110.

Base station 120 may include one or more devices that receive, process, and/or transmit traffic, such as audio, video, text, and/or other data, destined for and/or received from user device 110. Base station 120 may receive traffic from and/or send traffic to network 160. Base station 120 may send traffic to and/or receive traffic from user device 110 via an air interface. Base station 120 may enforce uplink and/or downlink policies (e.g., via rate policing, etc.). One or more of base stations 120 may be associated with a RAN. The RAN may be associated with a long term evolution (LTE) network that is based on the Third Generation Partnership Project (3GPP) architectural standard. In this example, the one or more base stations 120 may be an evolved Node B (eNB) device. In another example, one or more other base stations 120 may be associated with a RAN that is not associated with a LTE network.

Base station 120 may include one or more virtual local area networks (VLANs) with which to transport the traffic. In one example, base station 120 may receive traffic (e.g., unicast traffic), that is destined for user device 110, via a port associated with a VLAN. The VLAN may enable the traffic to be transmitted to user device 110 via another port that is connected to user device 110. In another example implementation, base station 120 may include a multicast VLAN (MVLAN) with which to transport multicast traffic to one or more user devices 110. The MVLAN may include one or more ports that are configured based on a group membership, associated with multicast traffic, that identifies a group of user devices 110. In one example, base station 120 may receive multicast traffic that is destined for the group of user devices 110. The MVLAN may enable copies of the multicast traffic to be generated for each user device 110 associated with the group membership. The MVLAN may enable the copies of the multicast traffic to be transmitted to the group of user devices 110.

Base station 120 may transmit information associated with traffic load conditions (e.g., hereinafter referred to as "traffic load information") to content gateway 140. Traffic load information may identify a quantity of bandwidth being processed by base station 120, a quantity of bandwidth that is available with respect to maximum quantity of bandwidth that can be processed by base station 120 (e.g., a bandwidth capacity relative to each frequency band, frequency allocation, etc.), and/or a quantity of applications and/or services being provisioned via base station 120. The traffic load information may also identify a type of traffic being provisioned (e.g., unicast, multicast, video, voice, text, etc.) via base station 120, a quantity of user devices 110 being served by base station 120, etc.

SGW 130 may include one or more devices, or other types of computation or communication devices, that gather, process, search, store, and/or provide information in a manner described herein. SGW 130 may include one or more data processing and/or traffic transfer devices or network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more base stations 120 and may send the aggregated traffic to network 160. SGW 130 may also receive traffic from network 160 and may send the received traffic to user device 110 via base station 120. SGW 130 may perform handoff operations between cells and/or base stations 120 via which user device 110 is communicating.

Content gateway 140 may include one or more devices, or other types of computation or communication devices, that gather, process, search, store, and/or provide information in a manner described herein. In an example implementation, content gateway 140 may process unicast and/or multicast traffic to be distributed to one or more user devices 110. For example, content gateway 140 may receive traffic (e.g., streaming video and/or audio, progressive video and/or audio, etc.) from content provider 150. Content gateway 140 may transmit the traffic to user device 110 via network 160, SGW 130 and/or base station 120. Content gateway 140 may buffer the traffic to ensure that the traffic is transmitted at a bandwidth and/or data rate that conforms to a policy associated with network 160, that abides by a service level agreement (SLA) with user device 110, and/or that can be processed by user device 110.

Content gateway 140 may transmit the traffic as unicast traffic or multicast traffic. For example, content gateway 140 may transmit unicast traffic that is destined for user device 110 based on information associated with user device 110, such as a destination address (e.g., an Internet protocol (IP) address, a media access control (MAC) address, a port identifier, etc.), a device identifier (e.g., an international mobile subscriber identity (IMSI) number, mobile directory number (MDN), mobile subscriber integrated services digital network (MSISDN) number, etc.), etc. In another example, content gateway 140 may transmit the traffic as multicast traffic that is destined for a group of user devices 110 (e.g., associated with a multicast group membership) based on information associated with the each of the group of user devices 110. When transmitting the multicast traffic, content gateway 140 may transmit a multicast stream to base station 120 for distribution to one or more user devices 110 identified by the multicast stream. In another example, content gateway 140 may transmit a copy of the multicast stream to another base station 120 for distribution to another one or more user devices 110 identified by the copy of the multicast stream.

Content gateway 140 may communicate with base stations 120, via SGW 130, to obtain traffic load information associated with each base station 120. Content gateway 140 may dynamically obtain the traffic load information based on an occurrence of some event (e.g., when congestion is detected within base station 120), periodically (e.g., every thirty minutes, hour, two hours, six hours, etc.), and/or at one or more times of each day (e.g., at midnight, 3 a.m., 6 a.m., 8 a.m., etc.), etc.

Content gateway 140 may use the traffic load information to allocate RAN resources among each of base stations 120, and/or frequency bands (e.g., PCS band, an advanced wireless services (AWS) band, an upper 700 megahertz (MHz) band, a lower 700 MHz band, a cellular band, etc.) and/or frequency allocations being processed by base stations 120. For example, content gateway 140 may allocate a first frequency band and/or allocation to an application and/or service (e.g., voice-over-IP (VoIP) traffic, voice traffic, etc.). In another example, content gateway 140 may allocate a second frequency band and/or allocation to another application and/or service (e.g., internet traffic, email traffic, etc.).

In yet another example, content gateway 140 may allocate a third frequency band and/or allocation to a further application and/or service associated an application and/or service that is transmitted as multicast and/or broadcast traffic. In this example, the multicast traffic may be associated with an evolved multimedia broadcast multicast service (eMBMS) protocol. Content gateway 140 may, for example, determine that a quantity of user devices 110, that are accessing the multicast and/or broadcast traffic via a particular cell and/or base station 120 (e.g., such as by user devices 110 accessing the multicast and/or broadcast traffic while attending an event at a stadium, etc.), is greater than a threshold. Based on the determination that the quantity of user devices 110 is greater than the threshold, content gateway 140 may allocate one or more other base stations 120, frequency bands, and/or frequency allocations to the multicast and/or broadcast traffic. Content gateway 140 may, in another example, determine that a quantity of bandwidth, associated with the multicast and/or broadcast traffic being transported via base station 120, is greater than another threshold and may allocate another base station 120, frequency band, and/or frequency allocation to the multicast and/or broadcast traffic.

Content gateway 140 may generate allocation information based on the traffic load information and/or information associated with a manner in which RAN resources were allocated to provision the applications and/or services. In another example, content gateway 140 may generate the allocation information based on previous traffic load information. Content gateway 140 may transmit the allocation information to user devices 110. In one example, content gateway 140 may generate a system information block (SIB) that identifies the applications and/or services and which base station 120, frequency band, and/or allocation is to be used, by user devices 110, to obtain the applications and/or services. Content gateway 140 may dynamically generate the SIB for transmission to user devices 110, via SGW 130, and/or base stations 120 based on an occurrence of some event, on a periodic basis, at one or more times each day, etc.

Content provider 150 may include any type or form of content provider. For example, content provider 150 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., YouTube, Vimeo, Netflix, Hulu, Veoh, etc.) that stream content from web sites and/or permit content to be downloaded (e.g., via progressive download, etc.). Content provider 150 may include on-demand content providers (e.g., video on demand (VOD) providers, pay per view (PPV) providers, etc.). A media stream, as used herein, may refer to a stream of content that includes video content (e.g., a video stream), audio content (e.g., an audio stream), and/or textual content (e.g., a textual stream).

Network 160 may include one or more wired and/or wireless networks. For example, network 160 may include a cellular network, a public land mobile network (PLMN), a second generation (2G) network, a third generation (3G) network, a fourth generation (4G) network, a fifth generation (5G) network, and/or another network. Additionally, or alternatively, network 160 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2:
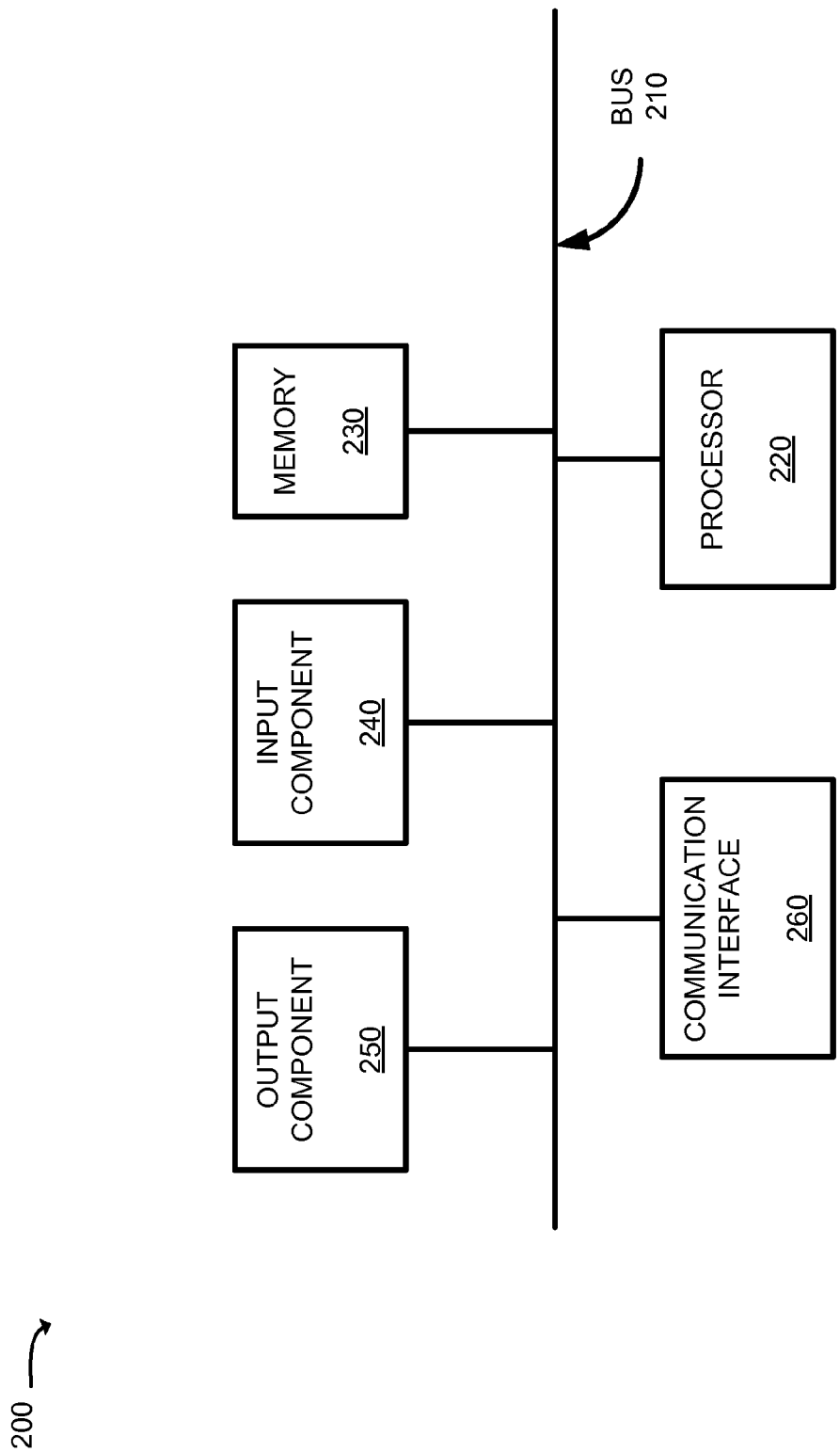
FIG. 2 is a diagram of example components of one or more devices of FIG. 1.

FIG. 2 is a diagram of example components of a device 200. Device 200 may correspond to user device 110, content gateway 140, and/or content provider 150. Alternatively, or additionally, each of user device 110, content gateway 140, and/or content provider 150 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 160. In one alternative implementation, communication interface 260 may be a logical component that includes input and output ports, input and output systems, and/or other input and output components that facilitate the transmission of data to other devices.

As described herein, device 200 may perform certain operations relating to allocating RAN resources for provisioning applications and/or services. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
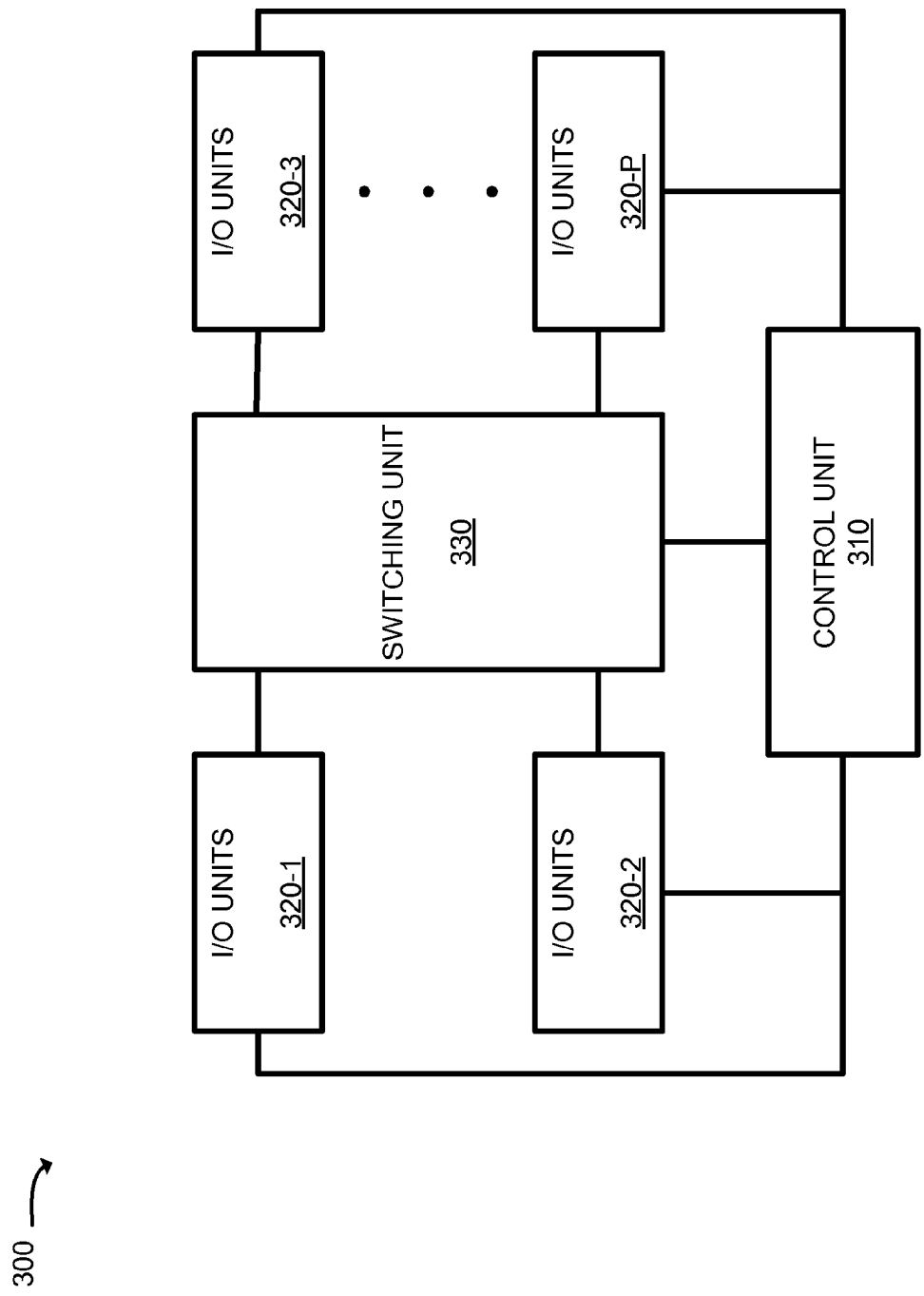
FIG. 3 is a diagram of example components of another one or more devices of FIG. 1.

FIG. 3 is a diagram of example components of device 300 that may correspond to one or more of base station 120 and/or SGW 130. Alternatively, or additionally, base station 120 and/or SGW 130 may include one or more devices 300. Although, FIG. 3 illustrates example components of device 300, in other implementations, device 300 may include additional components, fewer components, different components, or differently arranged components than those illustrated in FIG. 3 and described herein. Additionally, or alternatively, one or more operations described as being performed by a particular component of device 300 may be performed by one or more other components, in addition to or instead of the particular component of device 300.

Device 300 may receive network traffic, as one or more packet stream(s), from physical links, may process the packet stream(s) to determine destination information, and may transmit the packet stream(s) out on links in accordance with the destination information. Device 300 may include a control unit 310, a set of input/output (I/O) units 320-1, . . . , 320-P (where P≥1) (hereinafter referred to collectively as "I/O units 320" and individually as "I/O unit 320"), and a switching unit 330.

Control unit 310 may include a processor, a microprocessor, or some form of hardware logic (e.g., an application specific integrated circuit (ASIC) or a field programmable gate array (FPGA)). In one example implementation, control unit 310 may include an Ethernet controller and/or another controller device. Control unit 310 may perform high level management functions for device 300. For example, control unit 310 may maintain the connectivity and manage information/data necessary for transferring data by device 300. Control unit 310 may create routing tables based on network topology information, create forwarding tables based on the routing tables, and communicate the forwarding tables to I/O units 320. I/O units 320 may use the forwarding tables to perform route lookup for incoming data and perform the forwarding functions for device 300. Control unit 310 may also perform other general control and monitoring functions for device 300.

I/O unit 320 may include a component or collection of components to receive incoming traffic, to process incoming and/or outgoing traffic, and/or to transmit outgoing traffic. For example, I/O unit 320 may include I/O ports, an Ethernet interface and/or another type of interface, a central processing unit (CPU), and/or a memory device. I/O unit 320 may include a collection of ports that receive or transmit traffic via physical links. I/O unit 320 may also include data processing component(s), switch interface component(s), Internet processor component(s), memory device(s), etc.

Each of I/O units 320 may be connected to control unit 310 and switching unit 330. I/O units 320 may receive traffic on physical links connected to a network (e.g., network 160). Each physical link could be one of many types of transport media, such as an optical fiber or an Ethernet cable.

I/O units 320 may process incoming traffic prior to transmitting the traffic to another I/O unit 320 or a physical link. I/O units 320 may perform route lookups for the traffic using the forwarding table from control unit 310 to determine destination information. If the destination indicates that the traffic should be sent out on a physical link, connected to I/O unit 320, then I/O unit 320 may prepare the traffic for transmission by, for example, adding any necessary headers and/or modifying existing headers, and/or transmitting the traffic from the port associated with the physical link. If the destination indicates that the traffic should be sent to another I/O unit 320 via switching unit 330, then I/O unit 320 may, if necessary, prepare the traffic for transmission to the other I/O unit 320 and/or may send the traffic to the other I/O unit 320 via switching unit 330.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

As described herein, device 300 may perform certain operations relating to allocating RAN resources for provisioning applications and/or services. Device 300 may perform these operations in response to control unit 310 and/or one or more I/O units 320 executing software instructions contained in a computer-readable medium, such as a memory associated with control unit 310 and/or the one or more I/O units 320, respectively. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example extended system information data structure 400 that stores allocation information. The allocation information may identify how applications and/or services are allocated among frequency bands and/or are to be accessed by user device 110. Data structure 400 may be stored in a memory and/or storage device associated with content gateway 140. Data structure 400 may include a collection of fields, such as a system information block (SIB) identifier (ID) field 405, a time field 410, a service ID field 415, a service type field 420, a frequency ID field 425, and a base station ID field 430. Data structure 400 includes fields 405-430 for explanatory purposes. In practice, data structure 400 may include additional fields, fewer fields, different fields, and/or differently arranged fields than are described with respect to flow data structure 400.

SIB ID field 405 may store information that uniquely identifies (e.g., such as a SIB identifier) particular allocation information, that is stored in data structure 400, from other allocation information that was previously stored within data structure 400. Time field 410 may store a time associated with the particular allocation information that has been stored within data structure 400. Service ID field 415 may store information that identifies an application and/or service that is being provisioned by base stations 120 associated with a RAN. For example, the information that identifies the application and/or services may include an application and/or service identifier (e.g., an application name, etc.), an access point name (APN) associated with the application and/or service, information that identifies a flow (e.g., a flow identifier) associated with the application and/or service, etc.

Service type field 420 may store information that identifies a type of traffic associated with the application and/or service identified in service ID field 415. For example, service type field 420 may store information that identifies whether the type of traffic is unicast, multicast, and/or broadcast traffic. In another example, service type field 420 may store information that identifies whether the traffic is associated with streaming video, streaming audio, messaging traffic (e.g., instant messaging, email, etc.), Internet traffic (e.g., based on browsing, etc.) and/or other types of traffic.

Frequency ID field 425 may store information that identifies a particular frequency band and/or a frequency allocation, within the particular frequency band, via which the application and/or service, identified in service ID field 415, can be accessed by user device 110. For example, Frequency ID field 425 may store information that identifies one or more allocations, associated with the particular frequency band, such as, for example, a PCS band (e.g., 1.85-1.99 gigahertz (GHz)), an AWS band (e.g., 1.71 to 1.755 GHz), a lower 700 megahertz (MHz) band, an upper 700 MHz band, a cellular band (e.g., 850 MHz), and/or some other band (e.g., as specified by one or more 3GPP standards, etc.). Base station ID field 430 may store information that identifies via which base station 120 an application and/or service, identified in service ID field 415, can be obtained. The identified base station 120 may provision the application and/or service, to user device 110, at the particular frequency band and/or allocation identified in Frequency ID field 425.

Content gateway 140 may obtain traffic load information, from each base station 120 associated with a RAN, and may allocate resources, within the RAN, to provision applications and/or services to user devices 110. For example, content gateway 140 may store, within data structure 400, information associated with an application and/or service (e.g., APN1) and/or an indication that the application and/or service can be obtained as multicast traffic (e.g., MT) (e.g., as shown by ellipse 432). Content gateway 140 may store, within data structure 400, information that identifies a frequency band and/or frequency allocation (e.g., band 1/allocation 1) that has been allocated to the application and/or service, and/or information associated with which base station 120 (e.g., 120-1, 120-2, 120-N) the application and/or service can be obtained as multicast traffic (e.g., as shown by ellipse 432). Content gateway 140 may allocate additional resources to provision the application and/or service as multicast traffic. For example, content gateway 140 may store, within data structure 400, information that identifies another frequency band and/or allocation (e.g., band 2/allocation 2) that has been allocated to the application and/or service, and/or information associated with another base station 120 (e.g., 120-1) from which the application and/or service can be obtained as the multicast traffic (e.g., as shown by ellipse 434). In this example, band 1 may correspond to an upper 700 MHz band and band 2 may correspond to an AWS and/or some other band.

In another example, content gateway 140 may store, within data structure 400, information associated with another application and/or service (e.g., service1) and/or an indication that the other application and/or service can be obtained as unicast traffic (e.g., UT) (e.g., as shown by ellipse 436). Content gateway 140 may store information that a frequency band and/or allocation (e.g., band 3/allocation 1) that has been allocated to the other application and/or service, and/or information associated with base station 120 (e.g., 120-1-120-N) from which the other application and/or service can be obtained as the unicast traffic (e.g., as shown by ellipse 436).

In yet another example, content gateway 140 may store, within data structure 400, information associated with a further application and/or service (e.g., application1) and/or an indication that the further application and/or service can be obtained as broadcast traffic (e.g., BT) (e.g., as shown by ellipse 438). Content gateway 140 may store information that a frequency band and/or allocation (e.g., band 3/allocation 2) that has been allocated to the further application and/or service, and/or information associated with base station 120 (e.g., 120-1 and/or 120-3) from which the further application and/or service can be obtained as the broadcast traffic (e.g., as shown by ellipse 438).

Figure 5:
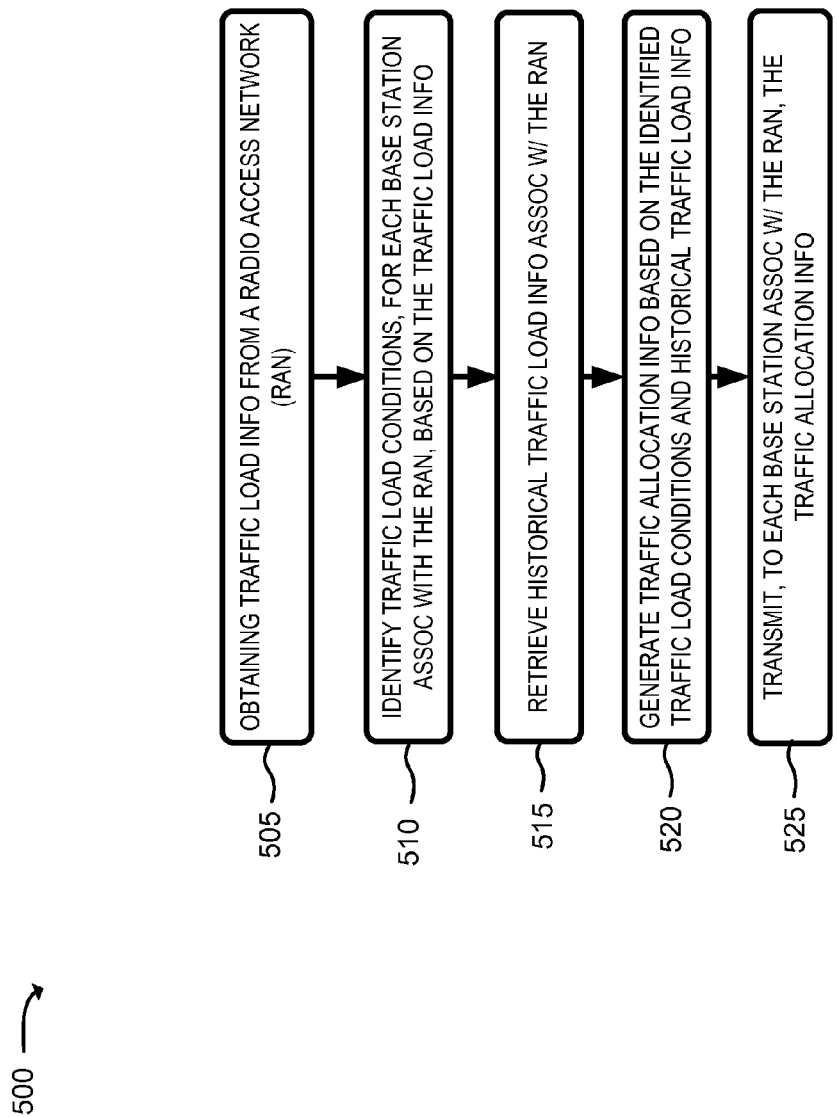
FIG. 5 is a flow chart of an example process for dynamically generating allocation information, according to an implementation described herein.

FIG. 5 is a flow chart of an example process 500 for dynamically generating allocation information, according to an implementation described herein. In one example implementation, process 500 may be performed by content gateway 140. In another example implementation, some or all of process 500 may be performed by a device or collection of devices separate from, or in combination with content gateway 140.

As shown in FIG. 5, process 500 may include obtaining traffic load information from a RAN (block 505). For example, content gateway 140 may determine that traffic load information is to be obtained from one or more base stations 120 associated with a RAN. Content gateway 140 may base the determination that the traffic load information is to be obtained on a predetermined time (e.g., based on a particular time of the day, etc.) when the traffic load information is to be obtained, a time interval (e.g., every three minutes, one hour, two hours, six hours, etc.), as a result of an occurrence of some event (e.g., an indication that base station 120 is congested), etc. Based on the determination that the traffic load information is to be obtained, content gateway may transmit an instruction, to base stations 120, to obtain the traffic load information for each of base stations 120. Base stations 120 may receive the instruction and may transmit, to content gateway 140, the traffic load information. The traffic load information may identify a quantity of bandwidth being processed by base station 120, a quantity of bandwidth that is available with respect to each frequency band, frequency allocation, etc., and/or a quantity of applications and/or services being provisioned via each base station 120. The traffic load information may also identify a type of content being provisioned (e.g., unicast, multicast, video, voice, text, etc.) via base station 120, a quantity of user devices 110 being served by base station 120, etc.

As also shown in FIG. 5, process 500 may include identifying traffic load conditions, for each base station associated with the RAN, based on the traffic load information (block 510). For example, content gateway 140 may use the traffic load information to identify applications and/or services that are being provisioned via the RAN. Content gateway 140 may use the traffic load information to identify a respective quantity of user devices 110 that are accessing each of the applications and/or services. Content gateway 140 may use the traffic load information to identify a quantity of bandwidth associated with each application and/or service and may identify a type of traffic associated with each application and/or service (e.g., multicast, unicast, video, voice, text, etc.). Content gateway 140 may use the traffic load information to determine a quantity of bandwidth being processed by each base station 120 relative to each frequency band and/or frequency allocation.

Content gateway 140 may use the traffic load information to determine a respective capacity of each base station 120. In one example, the respective capacity, of each base station 120, may identify a maximum quantity of user devices 110 that can be served by each base station 120. In another example, the respective capacity, of each base station 120, may identify a maximum quantity of bandwidth that can be processed by each base station 120.

Content gateway 140 may use the traffic load information to determine whether base station 120, associated with the RAN, is congested and/or has reached capacity. For example, content gateway 140 may determine that a quantity of user devices 110, being served by base station 120, is greater than a device threshold associated with base station 120. Based on the determination that the quantity of user devices 110, being served by base station 120, is greater than the device threshold, content gateway 140 may determine that base station 120 has reached capacity. Content gateway 140 may, based on the determination that base station 120 has reached capacity, allocate an available frequency band and/or frequency allocation (e.g., within the frequency band), associated with another base station 120, to provision traffic, to user devices 110 being served by base station 120. The allocation of the available frequency band and/or frequency allocation, associated with the other base station 120, may allow a portion of user devices 110, being served by base station 120, to access one or more applications and/or services, using the available frequency band and/or frequency allocation, via the other base station 120.

In another example, content gateway 140 may determine that a quantity of bandwidth, that is being used to provision an application and/or service, is greater than a maximum bandwidth threshold of a frequency allocation associated with a frequency band. Based on the determination that the quantity of bandwidth is greater than the maximum bandwidth threshold, content gateway 140 may determine that the frequency allocation and/or frequency band has reached capacity. Based on a determination that the frequency band and/or frequency allocation has reached capacity, content gateway 140 may allocate additional RAN resources to provision the application and/or service. Content gateway 140 may allocate the additional RAN resources by assigning another frequency allocation, within the frequency band and/or another frequency band to provision the application and/or service.

In yet another example, if the quantity of user devices 110 being served by base station 120 is less than a threshold, the content gateway 140 may not allocate additional RAN resources and/or may allocate additional applications to base station 120. In a further example, content gateway 140 may determine that a quantity of bandwidth, that base station 120 is using to provision a service and/or application, is less than a threshold. The threshold may be associated with one or more frequency bands and/or frequency allocations that are allocated to the service and/or application. Content gateway 140 may allocate fewer frequency bands and/or frequency allocations with which to provision the service and/or application based on the determination that the quantity of bandwidth, that base station 120 is using to provision a service and/or application, is less than the threshold. If the service and/or application is being provisioned as multicast traffic, content gateway 140 may provision the service and/or application as unicast traffic based on the determination that the quantity of bandwidth being used to provision the service and/or application, is less than the threshold.

As further shown in FIG. 5, process 500 may include retrieving historical traffic load information associated with the RAN (block 515). For example, content gateway 140 may retrieve, from a memory associated with content gateway server 140, previous traffic load information associated with a previous period in time. The previous traffic load information may identify a time period (e.g., during working hours) when peak traffic load conditions occur, another time period (e.g., during non-working hours) when non-peak traffic load conditions occur, etc. The peak load conditions may correspond to a quantity of bandwidth, a data rate, etc., associated with provisioning an application and/or service via a frequency band and/or frequency allocation within the frequency band. In another example, the peak load conditions may correspond to a quantity of user devices 110 being served by base station 120 and/or accessing an application and/or service via a frequency band and/or frequency allocation.

The previous traffic load information may be used, by content gateway 140, to forecast whether base station 120, associated with the RAN, is likely to reach capacity and/or become congested at a future point in time. For example, content gateway 140 may use traffic load information, obtained from base station 120, to identify a quantity of bandwidth and/or a data rate associated with multicast traffic that is being provisioned by base station 120 via a frequency band and/or frequency allocation. Content gateway 140 may use the previous traffic load information to identify whether the identified quantity of bandwidth and/or data rate is likely to increase, decrease, or not change at a future point in time. In one example, content gateway 140 may determine that the future point in time corresponds to peak bandwidth and/or data rate based on the previous traffic load information. Based on the determination that the future point in time corresponds to the peak bandwidth and/or data rate, content gateway 140 may forecast that the quantity of bandwidth and/or the data rate, being processed by base station 120, is likely to increase. Content gateway 140 may, based on the forecast that the quantity of bandwidth and/or the data rate is likely to increase, allocate additional resources to base station 120 in a manner described above with respect to block 510.

Content gateway 140 may, in another example, determine that the future point in time corresponds to a non-peak bandwidth and/or data rate and may forecast that the quantity of bandwidth and/or the data rate, being processed by base station 120, is likely to decrease or not change. Content gateway 140 may not allocate the additional resources based on the forecast that the quantity of bandwidth and/or the data rate is likely to decrease or not change.

Content gateway 140 may, in yet another example, use the previous traffic load information, in the manner described above, to forecast whether the quantity of user devices 110, being served by base station 120 and/or accessing an application and/or service, is increasing, decreasing, or not changing. Content gateway 140 may determine whether to allocate additional RAN resources (e.g., such as another base station 120, frequency band, frequency allocation, etc.) to serve user devices 110 and/or to provision the application and/or services to user devices 110. Content gateway 140 may in a manner similar to that described above, determine whether to allocate the additional RAN resources based on whether the quantity of user devices 110, being served by base station 120 and/or accessing the application and/or service, is increasing, decreasing, or not changing.

As yet further shown in FIG. 5, process 500 may include generating traffic allocation information based on the traffic load conditions and the historical traffic load information (block 520). For example, content gateway 140 may generate allocation information (e.g., as identified in data structure 400 of FIG. 4) that identifies a manner in which RAN resources are to be allocated to provision applications and/or services to user devices 110. The allocation information may be generated based on the traffic load information obtained from the RAN, the previous traffic load information obtained from the memory, identification of which base station 120 that has reached capacity, identification of which other base station 120 that is forecast to reach capacity at a future point in time, etc.

Content gateway 140 may, for example, generate allocation information that assigns frequency bands and/or frequency allocations (e.g., within the frequency bands) to applications and/or services being provisioned via base stations 120 associated with the RAN. For example, content gateway 140 may generate allocation information that assigns a respective frequency band and/or frequency allocation to each application and/or service based on a quantity of user devices 110 that are accessing the application and/or service. Content gateway 140 may generate allocation information that assigns a respective frequency band and/or frequency allocation to each application and/or service based on a quantity of bandwidth associated with provisioning the application and/or service via base station 120.

In another example, content gateway 140 may generate allocation information that assigns multiple frequency bands and/or frequency allocations to applications and/or services being provisioned as multicast and/or broadcast traffic (e.g., using an eMBMS protocol). Content gateway 140 may, for example, assign a first frequency band and/or one or more frequency allocations, associated with the first frequency band, to multicast traffic being provisioned via base station 120. Content gateway 140 may determine, based on the traffic load information, that a quantity of bandwidth associated with the multicast traffic and/or a quantity of user devices 110 accessing the multicast traffic causes the first frequency band and/or the frequency allocations, associated with the first frequency band to reach capacity. Content gateway 140 may assign a second frequency band and/or one or more frequency allocations, associated with the second frequency band, to the multicast traffic being provisioned by base station 120.

Content gateway 140 may, in yet another example, generate allocation information that assigns one or more additional frequency bands and/or allocations to an application and/or service being provisioned by base station 120 that is identified as having reached capacity and/or that is forecast to reach capacity. Assigning the respective frequency band and/or allocation to each application and/or service may cause base station 120 to provision, to one or more user devices 110, the application and/or service using the assigned frequency band and/or allocation. Assigning the additional frequency bands and/or allocations to the application and/or service may allow base station 120 to provision the application and/or service to other user devices 110 using the additional bandwidth associated with the additional frequency bands and/or allocations. The additional frequency bands and/or allocations may permit base station 120 to provision the application and/or service without reaching capacity and/or becoming congested on the frequency band and/or allocation via which the application and/or service is being provisioned to user devices 110.

As still further shown in FIG. 5, process 500 may include transmitting, to each base station associated with the RAN, the traffic allocation information (block 525). For example, content gateway 140 may store the allocation information in a data structure that enables the allocation information to be transmitted to each base station 120 associated with the RAN. In one example, the data structure may correspond to a SIB that includes the allocation information. Content gateway 140 may transmit a copy of the SIB to base station 120 associated with the RAN. Base station 120 may receive the SIB and may transmit the SIB to user devices 110 being served by base station 120. In one example, base station 120 may transmit the SIB to user device 110 when user device 110 powers up within a cell associated with base station 120. In another example, base station 120 may transmit the SIB to user device 110 when user device 110 is handed off, to base station 120, from another base station 120. In another example, base station 120 may transmit the SIB, to user device 110, in response to a request, for the allocation information, received from user device 110.

FIG. 6 is a flow chart of an example process 600 for accessing an application and/or service using allocation information, according to an implementation described herein. In one example implementation, process 600 may be performed by user device 110. In another example implementation, some or all of process 600 may be performed by a device or collection of devices separate from, or in combination with user device 110.

As shown in FIG. 6, process 600 may include receiving an instruction to access a service from a network (block 605) and retrieving traffic allocation information in response to the instruction (block 610). For example, a user, of user device 110, may desire to access an application and/or service from a network (e.g., network 160) and may instruct user device 110 to communicate, with the network, to access the application and/or service. User device 110 may receive the instruction and may retrieve, from a memory associated with user device 110, allocation information that identifies one or more applications and/or services that are accessible via base station 120 and/or one or more frequency bands and/or frequency allocations (e.g., within the frequency bands) from which the applications and/or services can be accessed. The allocation information may have been previously downloaded, from the network, in a manner similar to that described in FIG. 5.

As also shown in FIG. 6, process 600 may include identifying via which frequency band the service is to be accessed based on the traffic allocation information (block 615) and establishing the communication session, via the identified frequency band, to access the service (block 620). For example, user device 110 may identify the application and/or service within the application information and may determine which frequency band and/or frequency allocation corresponds to the identified application and/or service. User device 110 may communicate with base station 120 to obtain the application and/or service using the frequency band and/or frequency allocation that corresponds to the identified application and/or service.

In another example, the user may, at a future point in time, instruct user device 110 to access the application and/or service and user device 110 may retrieve, from the memory, updated allocation information. The updated allocation information may have been received from network 160, via base station 120, as a result of content gateway 140 reallocating RAN resources based on changes in traffic load conditions within the RAN since the allocation information was downloaded. User device 110 may identify, from the updated allocation information, another frequency band and/or frequency allocation via which to access the application and/or service. User device 110 may communicate with base station 120 to obtain the application and/or service using the other frequency band and/or frequency allocation that corresponds to the application and/or service.

In yet another example, user device 110 may access an application and/or service, via base station 120, that is being transmitted as multicast traffic (e.g., such as when user device 110 is located in a stadium at a sporting event). User device 110 may access the application and/or service, via base station 120 and in the manner described above, by identifying a frequency band and/or frequency allocation, that corresponds to the multicast traffic, from the allocation information. The user of user device 110 may exit the stadium (e.g., at the conclusion of the sporting event) and may begin communicating with another base station 120 (e.g., as the user of user device 110 commutes home after the sporting event) to cause user device 110 to be handed off from base station 120 to the other base station 120. User device 110 may receive other allocation information, from the other base station 120, and may identify another frequency band and/or frequency allocation, from the other allocation information, from which to access the multicast traffic. In another example, user device 110 may determine, from the other allocation information, that the application and/or service cannot be accessed as the multicast traffic. In this example, user device 110 may determine that the application and/or service can be accessed, via the other base station 120, as unicast traffic. User device 110 may identify, from the other allocation information, another frequency band and/or frequency allocation that corresponds to the application and/or service as unicast traffic. User device 110 may communicate, with the other base station 120, using the other frequency band and/or frequency allocation to access the application and/or service as the unicast traffic.

Systems and/or methods, described herein, may enable a network to identify traffic conditions within a RAN and to allocate network resources (e.g., frequency bands, available bandwidth, base station capacity, etc.), within the RAN, based on the identified traffic conditions. The systems and/or methods may allocate the network resources by assigning applications and/or services to various frequency bands and/or frequency allocations (e.g., within each of the frequency bands), based on the traffic conditions identified within the RAN.

The systems and/or methods may generate allocation information, based on the traffic conditions, which identifies a manner in which the various frequency bands and/or frequency allocations have been allocated to each of the applications and/or services. The systems and/or methods may also generate the allocation information to identify multiple frequency bands and/or frequency allocations, rather than a single multicast frequency band and/or frequency allocation, via which a user device can access an application and/or service as multicast traffic.

The systems and/or methods may allow the allocation information to be transmitted to the user device. Transmitting the allocation information, to the user device, may allow the user device to identify from which frequency band and/or frequency allocation a particular application or service is to be accessed and/or whether to access the particular application and/or service as unicast or multicast traffic. Additionally, or alternatively, allowing the user device to access the particular application and/or service, using the allocation information, may allow the RAN to provide, to the user device, the particular application and/or service, as unicast and/or multicast traffic, without becoming congested.

The foregoing description provides illustration and description, but is not intended to be exhaustive or to limit the implementations to the precise form disclosed. Modifications and variations are possible in light of the above disclosure or may be acquired from practice of the embodiments.

While series of blocks have been described with regard to FIGS. 5 and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software). The term network device may generally refer to any one (or more) of base station 120, SGW 130, content gateway 140, or content provider 150.

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:

receiving, by a device and from a plurality of base stations associated with a radio access network (RAN), traffic information that identifies traffic load conditions associated with the RAN;

identifying, by the device and from the traffic information, a respective quantity of bandwidth, associated with a one or more frequency allocations, that is used, by a base station of the plurality of base stations, to provision each of one or more services to user devices being served by the base station;

allocating, by the device, another respective quantity of bandwidth, associated with one or more other frequency allocations, to each of the one or more services based on the identification of the respective quantity of bandwidth that is used to provision each of the one or more services; and transmitting, by the device and to a user device, allocation information that identifies the manner that the other respective quantity of bandwidth, associated with the one more other frequency allocations, is allocated to each of the one or more services, where transmitting the allocation information allows the user device to identify via which frequency allocation, of the one or more other frequency allocations, to access a service of the one or more services.

2. The method of claim 1 further comprising:

retrieving, from a memory associated with the device, prior traffic information that identifies traffic load conditions, associated with the RAN, during a previous period of time;

allocating a further respective quantity of bandwidth, associated with one or more further frequency allocations, to each of the one or more services based on the prior traffic information; and transmitting, to the user device, other allocation information that identifies a manner that the further respective quantity of bandwidth, associated with the one more further frequency allocations, is allocated to each of the one or more services.

3. The method of claim 2, further comprising:

determining, based on the prior traffic information, that a first quantity of bandwidth, associated with a quantity of frequency allocations used by the base station to provision a particular service of the one or more services, is likely to increase to a second quantity of bandwidth at a future point in time;

allocating a greater quantity of frequency allocations to the particular service when the second quantity of bandwidth is greater than a threshold associated with the quantity of frequency allocations; and allocating the quantity of frequency allocations to the particular service when the second quantity of bandwidth is not greater than the threshold.

4. The method of claim 1, where identifying the respective quantity of bandwidth, associated with the one or more frequency allocations, further includes:

determining that a first quantity of bandwidth, used by the base station to provision one of the one or more services, is greater than a threshold associated with a frequency allocation, of the one or more frequency allocations, that is allocated to the one of the one or more services; and allocating at least one other frequency allocation, of the one or more other frequency allocations, to the one of the one or more services, where the at least one other frequency allocation allows a second quantity of bandwidth to be used, by the base station, to provision the one of the one or more services, and where the second quantity of bandwidth is greater than the first quantity of bandwidth.

5. The method of claim 1, where identifying the respective quantity of bandwidth, associated with the one or more frequency allocations, further includes:

determining that a first frequency allocation, of the one or more frequency allocations, that is used, by the base station, to provision a multicast service, of the one or more services, has reached capacity; and allocating a second frequency allocation, of the one or more other frequency allocations, to the multicast service.

6. The method of claim 5, where the first frequency allocation corresponds to a first frequency band, associated with at least one of: a personal communication service (PCS) band, an advanced wireless services (AWS) band, an upper 700 megahertz (MHz) band, a lower 700 MHz band, a cellular band, or a frequency band supported by a Third Generation Partnership Project (3GPP) standard, that is used to provision an evolved multimedia broadcast multicast service (eMBMS) within a long term evolution (LTE) network, and where the second frequency allocation corresponds to a second frequency band, associated with at least another one of: the PCS band, the AWS band, the upper 700 MHz band, the lower 700 MHz band, the cellular band, or the frequency band supported by the 3GPP standard.

7. The method of claim 1, further comprising:

storing the allocation information in a data structure; and transmitting the data structure to the user device, via the base station, when:

the user device powers up within a cell associated with the base station, the user device is handed off to the base station from another base station, of the plurality of base stations, or the user device requests the allocation information.

8. The method of claim 1, further comprising:

identifying that another base station, of the plurality of base stations, is congested based on the traffic information;

reallocating at least one service, of the one or more services, from the other base station to a further base station, of the plurality of base stations; and transmitting other allocation information that identifies the reallocation of the at least one service from the other base station to the further base station.

9. A user device, comprising:

a memory to store allocation information that identifies a manner in which one or more frequency bands are allocated, by a network, to provision one or more services, where the one or more services are provisioned, via a base station, of a plurality of base stations associated with the network, using the one or more frequency bands; and a processor to:

receive a request to obtain a service, of the one or more services, from the network, identify, from the allocation information and in response to the request, the service as a multicast service that can be obtained via a first frequency band, of the one or more frequency bands, or a second frequency band, of the one or more frequency bands, communicate, with the base station, to access the multicast service using the first frequency band or the second frequency band, receive an indication that the allocation information is to be obtained from the base station, wherein the indication is received when:

the user device powers up within a cell associated with the base station, or the user device is handed off to the base station, send, to the base station and as a result of the indication, a request for the allocation information, receive the allocation information from the base station responsive to the request for the allocation information, and store the allocation information in the memory.

10. The user device of claim 9, where the first frequency band corresponds to at least one of:

a cellular frequency band, an advanced wireless service (AWS) frequency band, a personal communications service (PCS) frequency band, an upper 700 megahertz (MHz) frequency band, a lower 700 MHz frequency band, or a frequency band supported by a Third Generation Partnership Project (3GPP) standard, and where the second frequency band corresponds at least another one of:

the cellular frequency band, the AWS frequency band, the PCS frequency band, the upper 700 MHz frequency band, the lower 700 MHz frequency band, or the frequency band supported by the 3GPP standard.

11. The user device of claim 9, where the processor is further to:

transmit, to another base station, of the plurality of base stations, another request to be handed off to the other base station, receive, from the other base station and as a result of the other request, other allocation information, where the other allocation information indicates that the service is to be accessed, as the multicast service, using the second frequency band, and obtain the multicast service, from the other base station, using the second frequency band.

12. The user device of claim 9, where the processor is further to:

transmit, to another base station of the plurality of base stations, a notification that the user device is being handed off to the other base station, determine, from the allocation information, that the multicast service is to be obtained, from the other base station, via a third frequency band, of the one or more frequency bands, and obtain the multicast service, from the other base station, using the third frequency band.

13. The user device of claim 9, where the processor is further to:

transmit, to another base station, of the plurality of base stations, another request to be handed off to the other base station, receive, from the other base station and as a result of the other request, other allocation information, where the other allocation information indicates that the service is to be accessed, as a unicast service, using the first frequency band, and obtain the unicast service, from the other base station, using the first frequency band.

14. The user device of claim 9, where, when the user device obtains the multicast service using the first frequency band, the processor is further to:

receive updated allocation information, from the base station, where the updated allocation information indicates that the multicast service is to be accessed via the second frequency band, and communicate, with the base station and via the second frequency band, to obtain the multicast service.

15. A non-transitory computer-readable medium containing one or more instructions executable by one or more processors, the computer-readable medium comprising:

one or more instructions to receive, from a base station associated with a radio access network (RAN), information that identifies traffic conditions within the base station;

one or more instructions to allocate one or more different frequency bands to each of one or more applications being provisioned, by the base station, to one or more user devices based on the information that identifies the traffic conditions within the base station;

one or more instructions to generate allocation information that identifies how the one or more different frequency bands are allocated to each of the one or more applications; and one or more instructions to transmit, via the base station, the allocation information to the one or more user devices, where the one or more instructions to transmit the allocation information allows a user device, of the one or more user devices, to identify at least one frequency band, of the one or more different frequency bands, with which to obtain an application of the one or more applications.

16. The computer-readable medium of claim 15, further comprising:

one or more instructions to retrieve prior information that identifies traffic load conditions, within the base station, during a previous period of time;

one or more instructions to identify, based on the prior information that identifies the traffic load conditions, that a first quantity of user devices, that are accessing the application of the one or more applications, is likely to increase to a second quantity of user devices by a future point in time; and one or more instructions to increase a quantity of frequency bands to be allocated to the application based on the identification that the first quantity of user devices, that are accessing the application, is likely to increase to the second quantity of user devices.

17. The computer-readable medium of claim 15, where the one or more instructions to retrieve the prior information that identifies the traffic load conditions further include:

one or more instructions to determine, based on the prior information that identifies the traffic load conditions, that a quantity of user devices that accessed a multicast application, of the one or more applications, via a first frequency band, of the one or more different frequency bands, caused the base station to become congested; and one or more instructions to allocate the first frequency band and a second frequency band, of the one or more different frequency bands, to the multicast application based on the determination that the quantity of user devices that accessed the multicast application, via the first frequency band, caused the base station to become congested.

18. The computer-readable medium of claim 15, further comprising:

one or more instructions to receive an indication that another user device is being handed off from another base station to the base station; and one or more instructions to transmit the allocation information to the other user device, where the one or more instructions to transmit the allocation information allows the other user device to access the one or more applications using the one or more different frequency bands.

19. The computer-readable medium of claim 15, further comprising:

one or more instructions to determine that a quantity of user devices that are accessing an application, as a multicast application, is less than a threshold; and one or more instructions to transmit the application, as a unicast application, based on the determination that the quantity of user devices that are accessing the application, as the multicast application, is less than the threshold.

* * * * *